(12) United States Patent
Buckingham et al.

(10) Patent No.: US 6,360,627 B1
(45) Date of Patent: Mar. 26, 2002

(54) OFFSET TRANSMISSION SHIFT LEVER ARRANGEMENT

(75) Inventors: David G Buckingham, Berkley; Kevin J Rachuk, Royal Oak; James R Shore, Detroit, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/602,088

(22) Filed: Jun. 22, 2000

(51) Int. Cl.[7] .............................. G05G 1/04; B60K 20/00
(52) U.S. Cl. ...................... 74/473.3; 74/473.29; 74/523
(58) Field of Search ............................. 74/523, 473.29, 74/473.3

(56) References Cited

U.S. PATENT DOCUMENTS

| | | | |
|---|---|---|---|
| 1,908,432 A | | 5/1933 | Hjermstad |
| 1,993,015 A | | 3/1935 | Moorhouse |
| 2,561,632 A | | 7/1951 | Nejezchleb |
| 3,732,746 A | * | 5/1973 | Fitzpatrick .................. 74/523 |
| 4,397,200 A | | 8/1983 | Reynolds |
| RE31,451 E | | 11/1983 | Osborn |
| 4,811,921 A | * | 3/1989 | Whitaker et al. ............ 74/523 |
| 4,862,760 A | * | 9/1989 | Kuwahara et al. ......... 74/473.3 |
| 4,977,789 A | | 12/1990 | Osborn |
| 5,347,881 A | * | 9/1994 | Watson et al. ............... 74/523 |
| 5,452,623 A | * | 9/1995 | Knight ........................ 74/523 |
| 5,845,534 A | | 12/1998 | Kim |

* cited by examiner

Primary Examiner—Thomas R. Hannon
Assistant Examiner—William C Joyce
(74) Attorney, Agent, or Firm—Mark P. Calcaterra

(57) ABSTRACT

An arrangement of an offset shift lever for an automotive vehicle transmission having a shift stub which is connected to the transmission and which also has a generally axial threaded bore. A metal cylindrical insert is sized to fit over the shift stub. The insert has a partially closed end with a fastener shank opening. An elastic isolator is bonded to the insert. The isolator has a fastener opening generally aligned with the fastener shank opening of the insert. A metallic canister encircles the isolator and is bonded thereto. The canister has a fastener opening and a shift lever opening. A shift lever is connected with the canister along its lower end which is received into the canister shift lever opening. The shift lever is aligned parallel and off-center to the shift stub by the canister. A threaded fastener is inserted through the canister and isolator fastener opening to threadably connect the shift lever canister isolator and insert with the transmission shift stub.

13 Claims, 3 Drawing Sheets

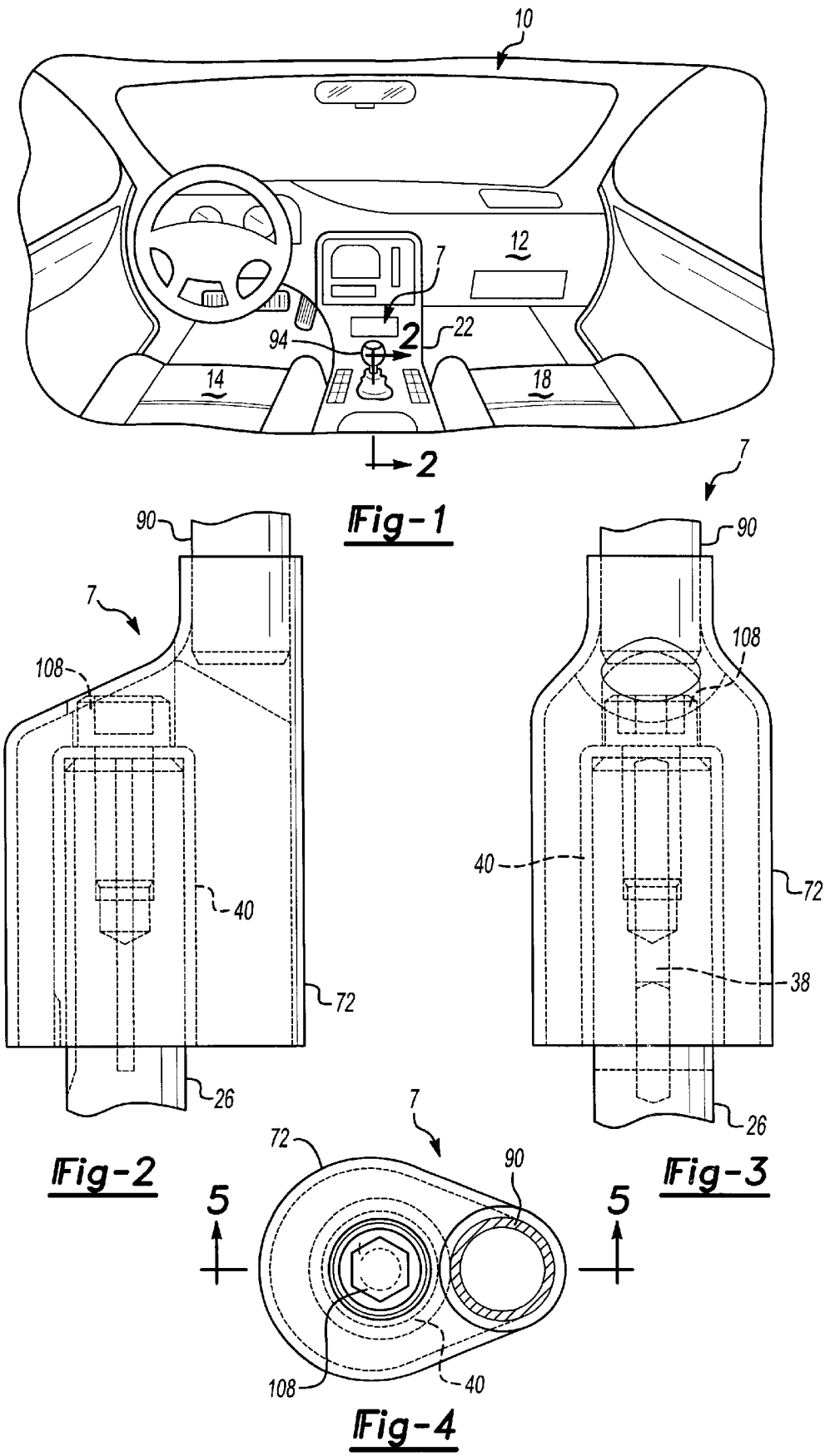

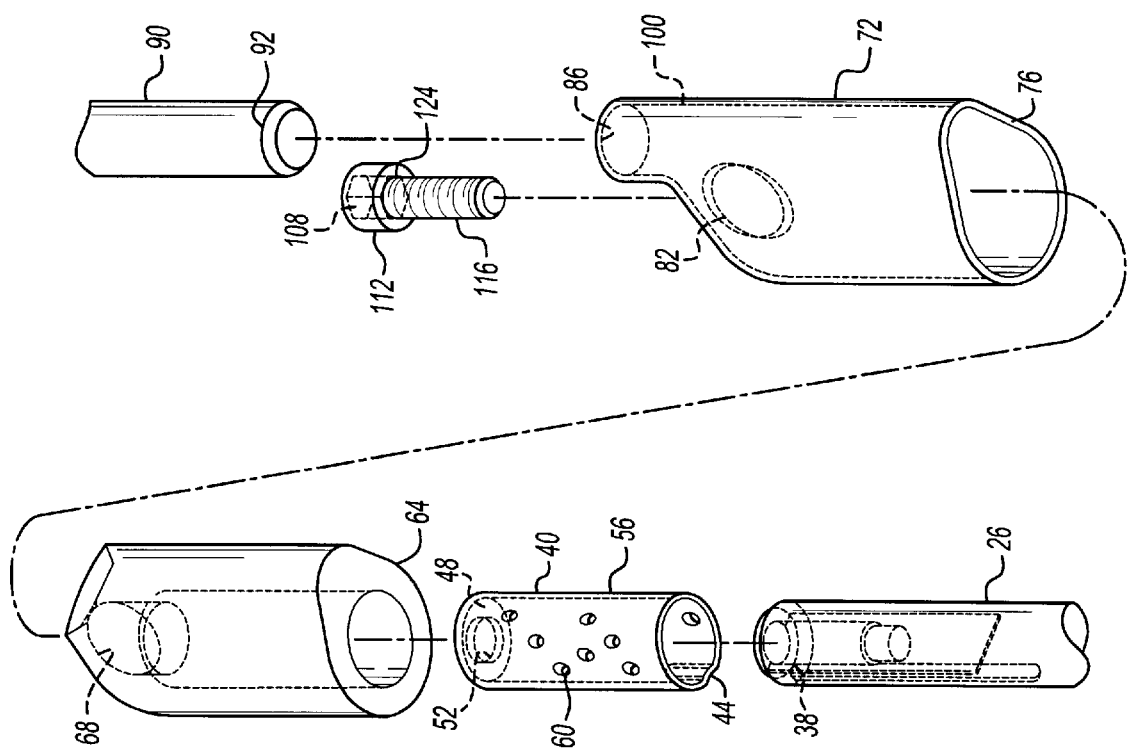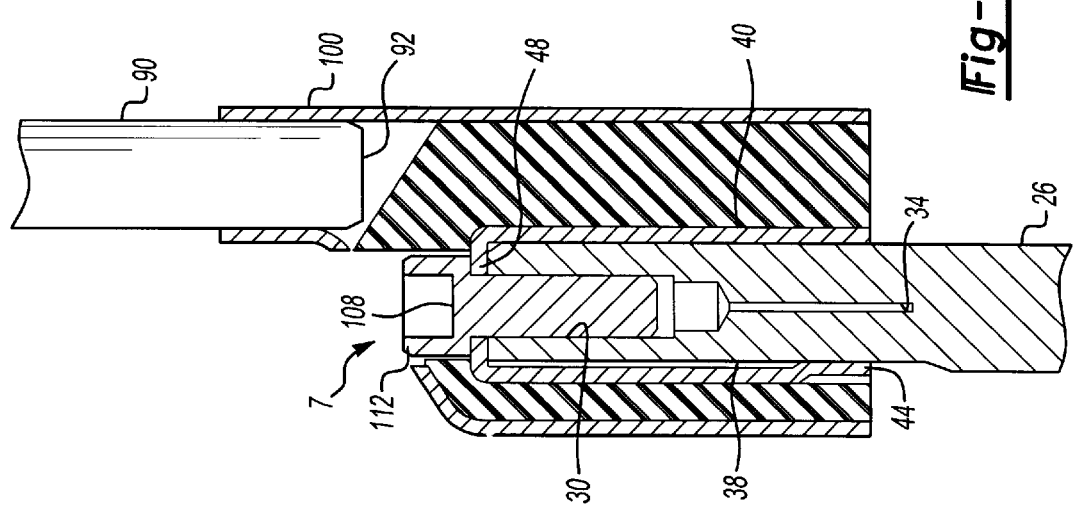

OFFSET TRANSMISSION SHIFT LEVER ARRANGEMENT

FIELD OF THE INVENTION

The field of the present invention is that of automotive vehicle transmission shift levers. More particularly, the field of the present invention is automotive vehicle transmission shift levers that are offset and usually project above a center-mounted console in the vehicle.

BACKGROUND OF THE INVENTION

One method of attaching a shift lever assembly to a transmission shift stub on a vehicle involves pressing the two components together using a specially made piston driven tool at a vehicle assembly plant. The above noted process has a lot of variability and occasionally does not fully seat the shift lever assembly on the shift stub. Once the shift lever assembly is installed on the transmission, the two cannot be separated without the use of a vice and pry bar. In order to do this both components must first be removed from the vehicle. Removing the shift stub and surrounding tower from the transmission can allow dirt or foreign objects to enter the transmission. Accordingly, the transmission may be susceptible to leakage at the shift tower if it is not carefully reinstalled. Therefore, it is highly desirable during service to be able to remove the shift lever assembly from the shift stub without removing the tower.

SUMMARY OF THE INVENTION

To make manifest the above-noted and other desires, the revelation of the present invention is brought forth.

A preferred embodiment offset transmission shift lever arrangement of the present invention is used to connect a shift lever assembly to a transmission shift stub. The offset shift lever arrangement consists of three initially separate parts: a shift lever assembly, a transmission shift stub, and a fastener. The shift lever assembly consists of the following four components: a shift lever, a metal canister, a rubber isolator, and a metal insert. The shift lever is welded to the metal canister. The rubber isolator is bonded to both the metal canister and the metal insert. During assembly of a vehicle, the shift lever assembly is pushed down onto the transmission shift stub. The metal insert has an index impression on its bottom edge, which fits into a groove on the shift stub. The above component fitting controls shift lever orientation. A fastener is then installed which holds the metal insert tightly to the shift stub. In order to provide tool clearance, the fastener is on the same centerline as the shift stub with the shift lever offset. The shift stub has a cut machined axially through its major diameter. The fastener is left partially unthreaded so that during final tightening, the shift stub spreads apart and exerts radial force on the metal insert. During service of the vehicle, the fastener is removed and the shift lever assembly is then easily pulled off the shift stub.

The offset shift lever arrangement of the present invention greatly simplifies the design and cost of both the transmission shift stub and the shift lever assembly. The single fastener attachment allows the shift lever assembly to be installed and removed quickly with an ordinary wrench. The new design assures that the shift lever assembly is fully seated on the shift stub. The offset may be oriented in the direction that best minimizes shift stub bend angles and enhances shift lever clearances. The shift stub can now be made from uniform diameter bar stock, which will significantly reduce manufacturing costs. The constant diameter of the shift stub will also reduce the possibility of damage to the lower shift boot during assembly and service.

It is an object of the present invention to provide an offset transmission shift lever arrangement. It is another object of the present invention to provide an offset transmission shift lever arrangement wherein the shift lever may be easily removed by the removal of a single threaded fastener.

The above-noted objects and other advantages of the present invention will become more apparent to those skilled in the art as the invention is further explained in the accompanying drawings and detailed description.

BRIEF DESCRIPTION OF THE DRAWINGS

FIG. 1 is a perspective view of an interior of an automotive vehicle that incorporates a preferred embodiment arrangement of a transmission offset shift lever according to the present invention.

FIG. 2 is a side elevational view taken along lines 2—2 of FIG. 1.

FIG. 3 is a front elevational view of the offset shift lever shown in FIGS. 1 and 2.

FIG. 4 is a top elevational view of the offset shift lever shown in FIGS. 1–3.

FIG. 5 is a sectional view taken along lines 5—5 of FIG. 4.

FIG. 6 is an exploded view illustrating the assembly of the offset shift lever shown in FIGS. 1–5.

DETAILED DESCRIPTION OF THE PREFERRED EMBODIMENTS

Figure 8:
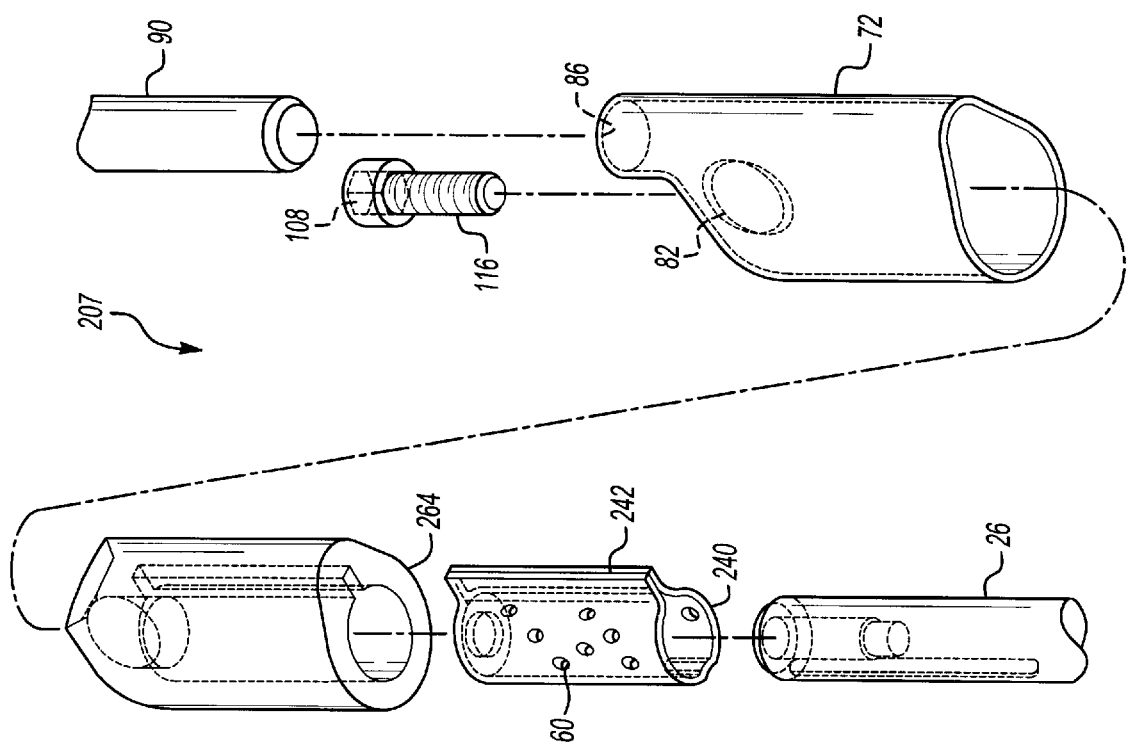
FIG. 8 is a view similar to that of FIG. 6 providing an exploded view of the alternative preferred embodiment shift lever arrangement shown in FIG. 7.

Referring to FIGS. 1–6, an automotive vehicle 10 has a passenger compartment 12 having a driver side seat 14 and a passenger side seat 18. Juxtaposed between the driver side seat 14 and passenger side seat 18 is a console 22 that conceals a transmission tunnel. Positioned within the transmission tunnel is a transmission.

The shift lever arrangement 7 includes a transmission shift stub 26. The shift stub extends into the passenger compartment 12. The shift stub 26 has a generally axial threaded bore 30 that is intersected by a planar axial slot 34. Along its front end outer surface, the shift stub 26 has a longitudinal locating groove 38.

The offset shift lever arrangement 7 has a cylindrical shaped insert 40. The insert 40 is sized to closely fit over the shift stub 26. As shown, the insert 40 is generally rigid and is made from a metallic material. The insert 40 has an indexing indention 44 to index the insert 40 to a predetermined angular orientation with respect to the shift stub 26 by engagement with the shift stub longitudinal groove 38. The insert 40 has a partially closed end 48. The partially closed end 48 has a fastener shank opening 52. A series of circular apertures 60 encircles the insert 40 along its cylindrical side 56.

Preferably molded to the cylindrical side 56 of the insert 40 is a polymeric isolator 64, which is provided to isolate vibration that emanates from the vehicle transmission that shift stub 26 is connected to. The isolator 64 is preferably fabricated from an elastomeric material such as natural rubber. The isolator 64 has a generally pear shaped cross sectional shape and is typically molded with the insert 40 being positioned within so as to allow the isolator to better grip the insert 40 by elastomeric material flowing through the apertures 60. The major portion of the width of isolator 64 is generally about the insert 40 and accordingly, shift stub 26. The isolator 64 has a fastener opening 68 that is generally aligned with the fastener shank opening 52 of the insert 40. However, the isolator fastener opening 68 will typically be somewhat larger than the insert fastener shank opening 52 to allow for passage of a threaded fastener head, hereinafter described.

Encircling the isolator 64 and typically moldably bonded thereto is a generally rigid canister 72. The canister 72 has a pear shaped cross sectional shape matching that of the isolator 64. The canister 72, as shown in FIG. 6, is metallic and has an opened bottom end 76 for receipt of the isolator 64. The canister 72 has a fastener opening 82 for passage of a fastener which is generally aligned with the fastener opening 68 of the isolator. The canister also has a shift lever opening 86.

A shift lever 90 is provided having a lower end 92 which is received into the canister shift lever opening 86. The shift lever lower end 92 is welded to the canister 72. The shift lever 90 at its upper end has a shift ball 94 (shown in FIG. 1). The shift lever is generally aligned parallel with and off-center to the shift stub 26 by a cylindrical portion 100 of the canister. Typically the elevation of the lower end 92 of the shift lever will be higher than an upper elevation of the shift stub 26.

The offset shift lever arrangement 7 also has a torx head threaded fastener 108. The fastener 108 has a head 112, which directly contacts the closed end 48 of the insert. The head 112 of the threaded fastener 108 passes through the fastener openings 82 of the canister and 68 of the isolator. A shank 116 of the fastener passes through the aforementioned openings and also passe ugh the fastener shank opening 52 of the insert 40. The shift lever 90, canister 72, isolator 64 and insert 40 are provided as an assembly which is connected with the shift stub 26 by the fastener 108. If desired a portion 124 of the fastener shank 116 along its upper end is deliberately left unthreaded. In such situations the attachment of the threaded fastener 108 to the shift stub 26 will cause the shift stub 26 to be spread out due to the axial slot 34 causing the shift stub 26 to further radially tighten its connection with the insert 40. In its installed position the head 112 of the fastener will be recessed from the lateral edges of the canister adjacent to the fastener opening 82 to prevent a vehicle occupant from snagging their clothing on the fastener 108. If maintenance is required on the transmission or the shift lever 90, the shift lever 90 can simply be removed by the untorquing of the fastener 108.

Figure 7:
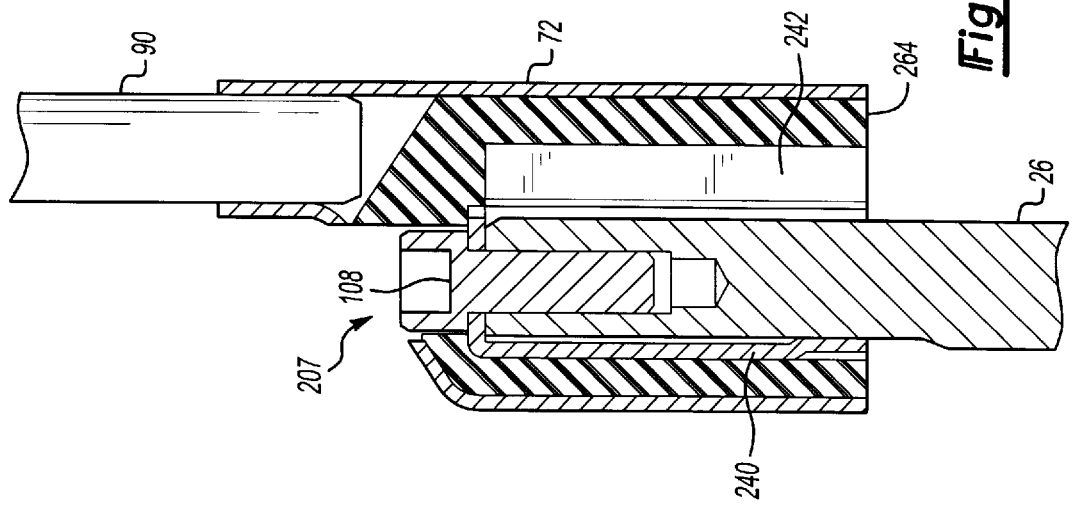
FIG. 7 is a view similar to FIG. 5 illustrating an alternative preferred embodiment shift lever arrangement according to the present invention.

FIGS. 7 and 8 illustrate an alternative preferred embodiment of the present invention with items performing similar functions being given similar reference numerals. In the shift lever arrangement 207, the insert 240 has a locating flange or fin 242. The locating fin 242 is utilized to locate and to provide an additional interface between the isolator 264 and the insert 240. The locating fin 242 also provides a more uniform isolator thickness between the canister 72 and the insert 240, and reduces isolator flex in the fore/aft direction. The remainder of the functions and the assembly of the offset shift lever 207 are essentially as previously described.

While preferred embodiments of the present invention have been disclosed, it is to be understood that they have been disclosed by way of example only and that various modifications can be made without departing from the spirit and scope of the invention as it is encompassed in the following claims.

We claim:

1. An arrangement of an offset shift lever for an automotive vehicle transmission comprising:

a shift stub connected with said transmission extending into a vehicular passenger compartment, said shift stub having a generally axial threaded bore along its extreme end and said shift stub having a locating groove on an outer surface of said shift stub;

a generally rigid cylindrical insert, said insert being sized to closely fit over said shift stub, said insert having an indexing indention to index said insert to a predetermined angular orientation with respect to said shift stub, said insert having a partially closed upper end with a fastener shank opening extending therethrough;

a polymeric isolator to isolate vibration from said transmission said shift stub is connected to, said isolator encircling said insert, said isolator having a fastener opening;

a generally rigid canister encircling said isolator, said canister having an opened bottom end for receipt of said isolator, said canister having a fastener opening and a shift lever opening;

a shift lever connected with said canister and having an end received into said canister shift lever opening, said shift lever being generally aligned parallel and off-center to said shift stub by said canister; and a headed threaded fastener for insertion through said canister and said isolator fastener openings for securing said shift lever, canister, isolator and said insert to said shift stub.

2. An arrangement of an offset shift lever for an automotive vehicle transmission as described in claim 1, wherein said fastener opening and said canister allows said head of said fastener to pass therethrough and said head of said fastener directly contacts said partially closed end of said insert.

3. An arrangement of an offset shift lever for an automotive vehicle transmission as described in claim 1, wherein said insert is metallic.

4. An arrangement of an offset shift lever for an automotive vehicle transmission as described in claim 1, wherein said insert has apertures to allow said isolator to bond with said insert.

5. An arrangement of an offset shift lever for an automotive vehicle transmission as described in claim 1, wherein said insert has a locating fin to locate said isolator with respect to said insert.

6. An arrangement of an offset shift lever for an automotive vehicle transmission as described in claim 1, wherein said shift stub has a slot intersecting with said threaded bore of said shift stub.

7. An arrangement of an offset shift lever for an automotive vehicle transmission as described in claim 1, wherein said shift stub locating groove is a longitudinal groove.

8. An arrangement of an offset shift lever for an automotive vehicle transmission as described in claim 1, wherein said isolator is fabricated from an elastomeric material.

9. An arrangement of an offset shift lever for an automotive vehicle transmission as described in claim 1, wherein said canister is fabricated from a metallic material.

10. An arrangement of an offset shift lever for an automotive vehicle transmission as described in claim 1, wherein said shift lever has a bottom end at a higher elevation than a top end of said shift stub.

11. An arrangement of an offset shift lever for an automotive vehicle transmission as described in claim 1, wherein the head of said fastener is recessed below an outer surface of said canister adjacent said fastener opening.

12. An arrangement of an offset shift lever for an automotive vehicle transmission as described in claim 1, wherein said canister has a pear-shaped cross sectional shape with a larger end of said pear-shaped cross sectional shape encircling said shift stub.

13. An arrangement of an offset shift lever for an automotive vehicle transmission comprising:

- a shift stub connected with said transmission extending into a vehicular passenger compartment, said shift stub having a generally axial threaded bore and said shift stub having a longitudinal locating groove on an outer surface of said shift stub;
- a metallic cylindrical shaped insert, said insert being sized to closely fit over said shift stub, said insert having an indexing indention to index said insert to a predetermined angular orientation with respect to said shift stub, said insert having a partially closed upper end with a fastener shank opening and said insert having a locating fin, said insert also having a plurality of apertures along a cylindrical side of said insert;
- an elastomeric isolator to isolate vibration from said transmission said shift stub its connected to, said isolator encircling said insert and said isolator having a fastener opening generally aligned with said fastener shank opening of said insert;
- a metallic canister encircling said isolator, said canister having an opened bottom end for receipt of said isolator, said canister having a fastener opening and a shift lever opening;
- a shift lever connected with said canister and having an end received into said canister shift lever opening, said shift lever being generally aligned parallel and off-center to said shift stub by said canister; and
- a headed threaded fastener for insertion through said canister fastener opening and said isolator fastener opening having a shank for threaded connection with said shift stub to connect said shift lever, said canister, said rubber isolator and said metal insert with said transmission shift stub by having the head of the fastener in direct contact with said partially closed end of said insert.

* * * * *